June 13, 1961 I. S. GOODMAN 2,988,661

ELECTROLUMINESCENT DEVICE

Filed Oct. 17, 1958 2 Sheets-Sheet 1

INVENTOR.
ISAAC S. GOODMAN.
BY W. D. Palmer
ATTORNEY.

ELECTROLUMINESCENT DEVICE

Filed Oct. 17, 1958 2 Sheets-Sheet 2

INVENTOR.
ISAAC S. GOODMAN
BY W. D. Palmer
ATTORNEY.

United States Patent Office 2,988,661

Patented June 13, 1961

2,988,661

ELECTROLUMINESCENT DEVICE

Isaac S. Goodman, Metuchen, N.J., assignor to Westinghouse Electric Corporation, East Pittsburgh, Pa., a corporation of Pennsylvania Filed Oct. 17, 1958, Ser. No. 767,821
1 Claim. (Cl. 313—108)

This invention relates to electroluminescent devices and, more particularly, to electroluminescent devices having simplified electrical connections thereto.

The phenomenon of electroluminescence was first disclosed by G. Destriau, one of his earlier publications appearing in London, Edinburgh and Dublin Philosophical Magazine, Series 7, vol. 38, No. 285, pages 700–737 (October 1947). Electroluminescent devices normally comprise a metallic backing plate which acts as one electrode, a layer of phosphor impregnated in dielectric coated thereover and a light-transmitting electrode over the phosphor-dielectric layer. The light-transmitting electrode normally comprises a layer of tin oxide on a glass foundation although other light-transmitting, electrically-continuous materials may be substituted therefor, such as a layer of copper iodide deposited directly onto the phosphor-dielectric layer. In addition, such electrically-continuous, light-transmitting electrodes can be replaced by a mesh of wires, for example, the interstices between the wires serving to pass the generated light.

In the operation of such devices as described, an energizing potential is connected to the metallic backing plate and the light-transmitting electrode to cause the device to electroluminesce. Such a construction normally requires that an electrical connection be made directly to the light-transmitting electrode and this presents many difficulties, particularly from a production standpoint. In explanation, in order to effect electrical connection between a lead conductor and a light-transmitting electrode material such as tin oxide, an additional bus bar or equivalent arrangement is normal required, necessitating a time-consuming and costly fabrication procedure. It is also time consuming and costly to attach a lead conductor to a fine wire mesh, primarily because of the small size of the wires or conductors comprising the mesh. Relatively fragile electrical connections to the light-transmitting electrodes also constitute an additional source for service failures.

It is the general object of the invention to avoid and overcome the foregoing and other difficulties of and objections to prior-art practices by the provision of a device to which simple and serviceable electrical connections can be made.

It is another object to provide an electroluminescent device having simplified electrical connections and which device can be readily adapted to present unusual illuminated patterns.

It is a further object to provide an electroluminescent device having simplified electrical connections and construction and incorporating different phosphor materials which electro-luminesce in different regions of the spectrum.

The aforesaid objects of the invention, and other objects which will become apparent as the description proceeds, are achieved by eliminating all electrical connections to the light-transmitting electrode. This is accomplished by making all electrical connections to relatively-massive, electrically-conducting members which are positioned in spaced and side-by-side relationship to form a composite electrode layer. A layer of phosphor embedded in dielectric material is positioned over the conducting members and a light-transmitting, electrically-conducting layer is placed over the phosphor-dielectric layer. The light-transmitting, electrically-conducting layer is electrically isolated from the source of energizing potential by the layer of phosphor-dielectric. By utilizing different phosphor materials in the phosphor-dielectric layer or by preselecting the size and configuration of the heavy conducting members to which all electrical connections for the device are made, unusual illumination effects can be achieved.

For a better understanding of the invention, reference should be had to the accompanying drawings wherein.

Figure 1:
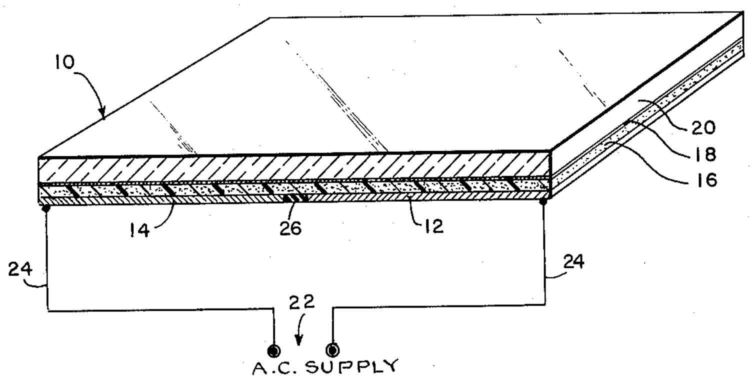
FIG. 1 is a perspective view of one embodiment of an electroluminescent device fabricated in accordance with the present invention.

With specific reference to the form of the invention illustrated in the drawings, the numeral 10 indicate generally an electroluminescent device comprising a composite electrode layer formed by two relatively-massive, metallic plates 12 and 14 which are placed in spaced and side-by-side relationship. Since the operative area of the device 10 is not larger than the total area of the metallic plates, these plates will normally extend over a considerable area. A layer 16 of electroluminescent phosphor embedded in dielectric material is positioned over the metallic plates 12 and 14 and an additional electrode comprising a layer of tin oxide 18 on a glass foundation 20 is positioned over the phosphor-dielectric layer 16. Electrical connections from the energizing source 22 to the device 10 are made through lead conductors 24 to each of the metallic plates 12 and 14 which form a composite electrode layer. The electrical connections between the lead conductors 24 and the metallic plates 12 and 14 can be made with a simple weld or other simple and positiove connecting procedure such as a screw connection. Such simple electrical connections are possible because of the mass or thickness of the metallic plates 12 and 14. In explanation, even if the plates 12 and 14 have a thickness of only 0.010 inch for example, they are still relatively-massive as compared to a conducting layer of tin oxide having a thickness measured in Angstrom units. Thus making serviceable electrical connections to such relatively-massive, electrically-conducting members is a comparatively simple procedure.

In essence the device as shown in FIG. 1 comprises two electroluminescent cells connected in series. Particularly at lower-frequency operation, such as 2,000 cycles and below, the electrical resistances of the device electrodes are sufficiently low that the energizing potential which is applied to the metallic plates 12 and 14 will be substantially uniformly distributed over the entire surface of these plates and the electrical potential which appears between the metallic plates 12 and 14 and the electrical-conducting layer 18 during operation of the cell will be substantially uniformly distributed therebetween. The device thus comprises two electroluminescent cells which are connected in series and if the plates 12 and 14 are preselected to have equal areas as in the illustrated embodiment, both of the series-connected electroluminescent cells will luminesce with equal brightness. The spacing between the metallic plates 12 and 14 should be so selected as to minimize any tendency for electrical breakdown therebetween and this spacing will normally be somewhat greater than the thickness of the phosphor-dielectric layer 16 in order to minimize any tendency for electrical breakdown through those portions of the phosphor-dielectric layer 16 which are positioned proximate the spaced edges of the individual plates 12 and 14. If desired, an additional insulating strip 26 can be included between the spaced edges of the plates 12 and 14.

The metallic plates 12 and 14 can be fabricated of any metallic material such as aluminum or steel and can have any desired configuration. As an example, each of the plates 12 and 14 can be formed as an aluminum sheet measuring 3 inches on a side and having a thickness of 0.01 inch. The phosphor-dielectric layer 16 can comprise any electroluminescent phosphor and the usual zinc-sulfide activated by copper and coactivated by chlorine is suitable. Other electroluminescent phosphors are well known. The dielectric material in which the phosphor is embedded can comprise any suitable light-transmitting dielectric material such as polyvinyl-chloride acetate or polystyrene, for example. Ceramic materials can be substituted for the aforementioned plastics as is well known. The ratio by weight of the phosphor to dielectric can be varied over a wide range and equal parts by weight, for example, can be used. The thickness of the phosphor-dielectric layer 16 is not critical and as an example is 0.5 mil. With such a construction, the spacing between the metallic plates 12 and 14 is desirably at least one mil. The additional strip 26 of insulating material which can be included between the metallic plates 12 and 14 can be formed of polyvinyl-chloride acetate. The light-transmitting, electrically-conducting layer 18 can be formed of tin oxide deposited on a foundation of glass 20. Such coated glass is commercially available under the trademark NESA, as sold by Pittsburgh Plate Glass Company. Other light-transmitting, electrically-conducting materials can be substituted for the tin oxide, such as indium oxide. Alternatively, a thin-wire mesh can be substituted for the electrically-continuous, light-transmitting electrode.

As a possible alternative embodiment, the layer 16 comprising the phosphor and dielectric can be formed in two sections adjacent to and conforming in configuration to the metallic plates 12 and 14, with a strip of high-electrical-breakdown material such as mica included therebetween. With such a construction, the plates 12 and 14 can be spaced more closely together. An additional layer of mica can also be incorporated parallel to and adjacent the phosphor-dielectric layer 16 to inhibit any tendency for electrical breakdown, such a construction being well known. It is also possible to utilize the phosphor as a thin film, with or without any additional layer of additional dielectric material adjacent thereto, or powdered phosphor can be compacted as such between the cell electrodes without admixed dielectric. The device as shown in FIG. 1 and as described hereinbefore is sutable for operation across a 110 volt, 60 cycle line. Half of the applied voltage will appear across each of the plates 12 and 14 and that portion of the light-transmitting conducting layer 18 oppositely disposed thereto. Since only half of the applied voltage appears across the phosphor-dielectric layer 16, this layer can be made correspondingly thinner in order to obtain good brightness. For operation at substantially higher voltages, the phosphor-dielectric layer 16 is desirably made thicker.

Figure 2:
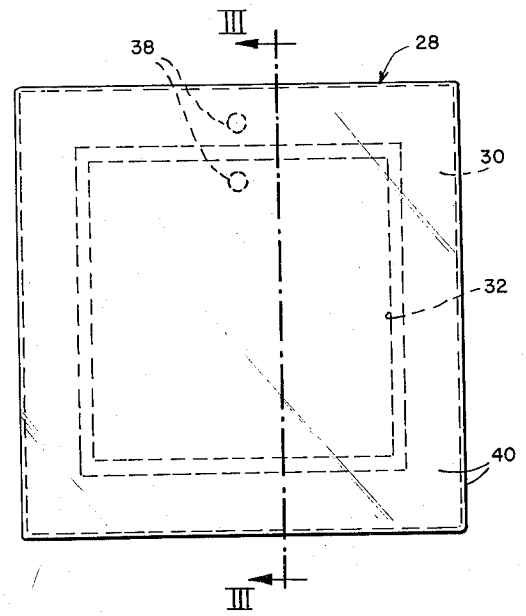
FIG. 2 is a plan view of an alternative embodiment of an electroluminescent device wherein the preferred metallic plates which form one composite electrode layer have a preselected configuration and area to present unusual display effects.
Figure 3:
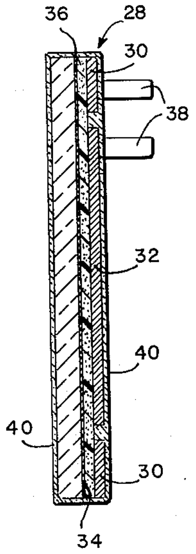
FIG. 3 is across-sectional view, taken on the line III—III in FIG. 2 in the direction of the arrows, showing in further detail the simplified electrical connections for the device.

For some applications, it is desirable to make one of the metallic plates greater in area than the other plate. The electrical effect of such a construction is similar to placing two condensers in series, with the condenser having the smaller area having the greatest potential drop developed thereacross. Electroluminescent devices are quite sensitive to voltage variations with respect to the developed brightness and as a general rule, the brightness is proportional to the formula $Ke-\sqrt{K_1/V}$, wherein "K" and "$K_1$" are constants varying with the phosphor and cell construction and "V" is the applied voltage. As a specific example, for the usual zinc sulfide, copper-activated electroluminescent phosphor, an increase in voltage of 20% will increase the brightness of electroluminescence by approximately 100%. These figures are only given by way of example and are subject to considerable variation, depending upon variations in preparation of the phosphor and other variables, as are known. In FIGS. 2 and 3 are shown a device embodiment 28 wherein the metallic plates which form a composite electrode layer are in side-by-side and concentric relationship. The outer or surrounding plate 30 has a generally-square configuration with the center portion removed therefrom. The inner metallic plate 32 is so conformed as to fit in spaced relationship within the outer plate 30. As an example, the area of the inner plate is 3.6 square inches and the area of the outer or peripheral plate is 3 square inches. Since electroluminescent cells are primarily capacitive in nature, more voltage will be developed between the plate 30 and that portion of the light-transmitting electrode 34 which is oppositely disposed thereto than will be developed between the inner plate 32 and that portion of the light-transmitting electrode 34 which is oppositely disposed thereto. As an example, the phosphor-dielectric layer 36 and electrode layer 34 correspond to those shown in FIG. 1. With such a construction and with an energizing potential of 110 volts, the outer or peripheral portion of the device 28 will be approximately twice as bright as the centrally-disposed portion, thereby producing unusual illuminating effects with a very simple construction and one source of energizing potential.

In FIG. 3 are shown further details for connecting the device 28 to the electrical-energizing source and as illustrated, a standard male connector 38 can readily be formed by welding contact pins to the metallic plates 30 and 32. The device as shown in FIG. 1 can be modified with respect to the use of a similar plug connector 38 in a manner similar to that shown in FIG. 3. For the purpose of preventing shock hazard the entire device 28 as shown in FIGS. 2 and 3 can be encased in a thin protective layer of insulating material 40, which can be applied by dipping the fabricated device into an insulating resin. The device as shown in FIG. 1 can be likewise protected.

Figure 4:
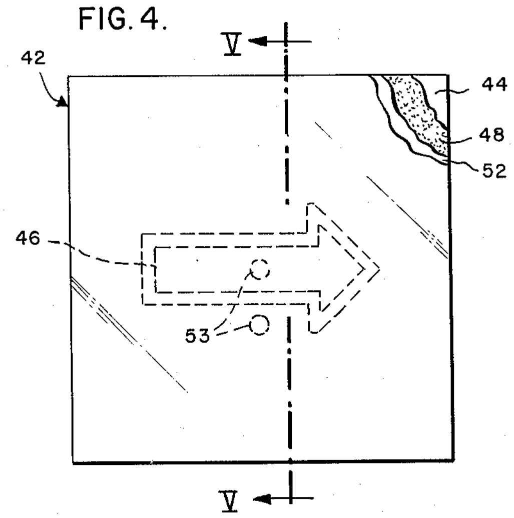
FIG. 4 is a plan view, partly broken away, illustrating another alternative embodiment, wherein different phosphor materials are used in order to achieve contrasting illumination effects.
Figure 5:
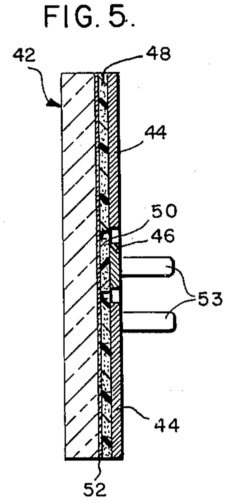
FIG. 5 is a cross-sectional view, taken on the line V—V in FIG. 4 in the direction of the arrows, showing constructional details for the device embodiment shown in FIG. 4.

In FIGS. 4 and 5 are shown a further alternative embodiment 42 wherein a metal plate 44, which forms a part of a composite electrode layer, has an arrow-shaped section removed from the center portion thereof. A similarly-conformed metallic plate 46 is positioned in spaced relationship within the arrow-shaped portion removed from the plate 44. A layer of phosphor-dielectric 48 is placed over the metallic plate 44 and as an example, the phosphor can be green-emitting, copper-activated, zinc sulfide electroluminescent phosphor. Additional phosphor and dielectric 50 are placed over the inner metallic plate 46 and as an example, this phosphor can be red-emitting, copper-activated, zinc selenide electroluminescent phosphor. Over the composite phosphor layers 48 and 50 are placed a light-transmitting, electrically-conducting electrode arrangement 52, such as shown in FIGS. 1–3 and a plug 53 is provided for electrical connection. The device when energized to electroluminescence will display a red arrow with a green background and the relative intensities of the red and green electroluminescence can be preselected by varying the areas of the plates 44 and 46 with respect to one another. As an alternative construction, the green-emitting phosphor layer 48 can extend partly over the inner metallic plate 46 if desired.

Figure 6:
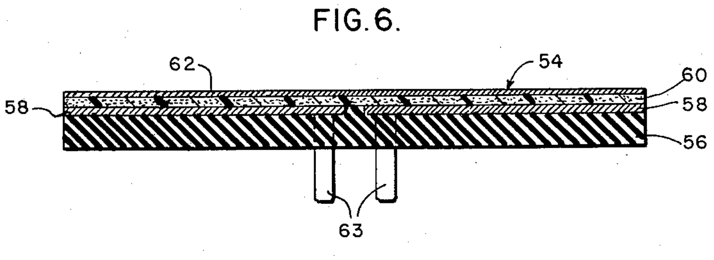
FIG. 6 is a cross-sectional elevation of still another embodiment wherein the light-transmitting, electrically-conducting electrode has been formed directly on the phosphor-dielectric layer and wherein rigidity for the device has been provided by an additional insulating layer positioned adjacent the spaced metallic plates of the device.

In the embodiments as shown in FIGS. 1 through 5, rigidity for the devices has been provided by means of the glass backing which carries the light-transmitting, tin oxide layer. If desired, this glass backing can be dispensed with and rigidity for the devices provided by an additional insulating layer, such as a layer of paper or fabric impregnated with urea formaldehyde and compressed under high temperature and pressure. Such an embodiment 54 is shown in FIG. 6 wherein a rigid insulating layer 56 is positioned adjacent the metallic plates 58 and exterior to the operative portion of the device. The embodiment as shown in FIG. 6 can correspond with respect to the metallic plates 58 and phosphor-dielectric 60 to the embodiment shown in FIG. 1. The light-transmitting, electrically-conducting layer 62, however, is formed directly on the phosphor-dielectric 60 and comprises copper iodide for example. Light-transmitting, electrically-conducting layers of copper iodide are known and can be formed by vacuum metallizing a thin layer of copper onto the phosphor-dielectric layer 60 and thereafter passing the device through iodine vapor until the copper is converted to copper iodide to become light-transmitting in nature. Electrical connection to the metallic plates 58 for the embodiment as shown in FIG. 6 can be made directly through the additional insulating layer 56 by contact pins 63, which can be welded to the metallic plates 58.

Figure 7:
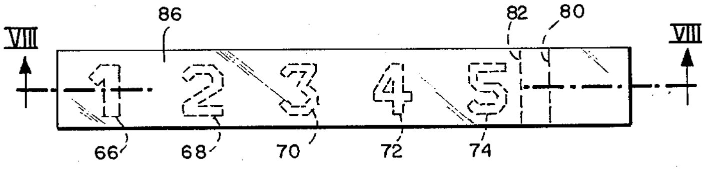
FIG. 7 is a plan view of an indicator device having simplified electrical connections in accordance with the present invention.
Figure 8:
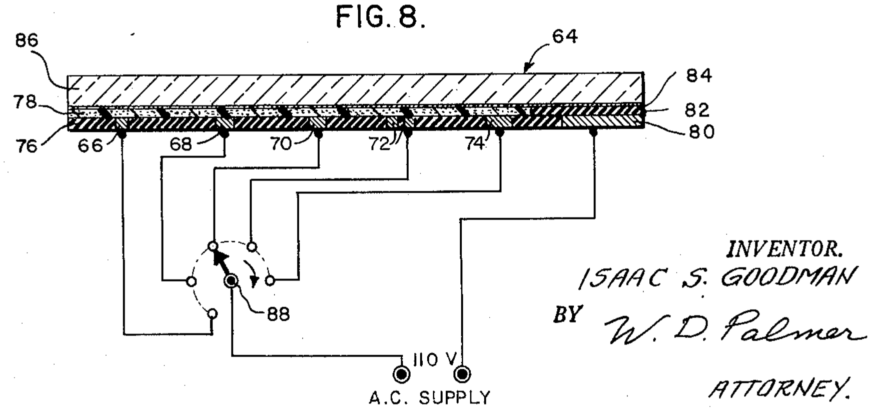
FIG. 8 is a cross-sectional elevation, taken on the line VIII—VIII in FIG. 7, showing in schematic form an energizing circuit and further showing the simplified electrical connections for the illustrated embodiment.

In FIGS. 7 and 8 are shown still another alternative form of the invention which comprises an indicating device 64, which is adapted to indicate in an illuminated fashion preselected numerals. The composite electrode of the device comprises a plurality of metallic plates 66, 68, 70, 72 and 74 respectively conforming in configuration to the numerals one through five which are desired to be displayed in the illustrated embodiment. These metallic plates 66–74 are desirably retained in position by an additional layer of insulating material 76, such as a layer of polyester resin for example. Over the conformed plates 66–74 is placed a layer of phosphor-dielectric material 78, which as an example can conform in composition and thickness to that as described in connection with the embodiment shown in FIG. 1. An enlarged metallic plate 80 is positioned at one end of the device and over this plate 80 is positioned a layer of insulating material 82 which has a thickness equal to that of the phosphor-dielectric layer 78. Over the phosphor-dielectric 78 and insulating layer 82 are placed a light-transmitting, electrically-conducting layer which can comprise a layer of tin oxide 84 coated onto a glass foundation 86, as described hereinbefore. In the operation of the device as shown in FIGS. 7 and 8, when an energizing potential such as 110 v. is placed in preselected fashion by means of a selector switch 88 across one of the metallic plates 66–74, the voltage drop across the plate 80 and the portion of the electrically-conducting coating 84 oppositely disposed thereto will be relatively small. Thus most of the applied potential will occur across whichever of the conformed plates 66–74 is energized and the portion of the electrically-conducting electrode layer 84 which is oppositely disposed thereto. If the plate 80 has for example three times the area of any one of the plates 66–74, it is not necessary in the usual case to utilize the additional insulating layer 82 over the metallic plate 80. In such a case, the phosphor-dielectric layer 78 could also extend over the enlarged plate electrode 80 if desired, since the voltage drop thereacross could be made sufficiently small as to minimize any undesired light emission from the phosphor-dielectric layer portions adjacent the enlarged plate 80. Thus by selectively applying potential between selected individual metallic plates 66–74 and the enlarged plate 80, any one of the numerals from one to five can be energized to illumination and no electrical connection need be made to the light-transmitting, electrically-conducting electrode layer 84. In addition, by varying the area of the plates 66–74 with respect to one another, the resulting displayed numerals can be made to vary with respect to brightness, without varying the energized potential. Thus in an indicator system, for example, when a relatively small electrode plate is energized, the energized portion of the phosphor-dielectric layer can be made to electroluminesce much brighter in order to indicate a danger signal for example.

It will be recognized that the objects of the invention have been accomplished by providing an electroluminescent device to which simplified electrical connections can readily be made and which device can be readily adapted to present unusual illuminated patterns, in different colors and in different brightnesses if desired.

Relatively-massive, non-metallic electrically-conducting members can be substituted for the preferred metallic plate members as shown in any of the foregoing embodiments. As an example, the metallic plates 12 and 14 as shown in FIG. 1 can be replaced by similarly-conformed, hard-pressed board fabricated of asbestos and Portland cement and sold by Johns-Manville Sales Corp. under the trademark "Transite." Further, the embodiment as shown in FIG. 6 can be rendered flexible in nature by replacing the metallic plates 58 by similarly-conformed conducting rubber and by replacing the rigid insulating layer 56 with a resilient non-conducting rubber for example. Conducting rubbers are well known and commercially available and are normally rendered conducting in nature by the addition of finely-divided carbon. Electrical contact to the conducting rubber can be readily effected with a simple clamp.

While several embodiments have been illustrated and described in detail, it is to be particularly understood that the invention is not limited thereto or thereby.

I claim:

An electroluminescent device comprising, more than two metallic plates positioned in spaced and side-by-side relationship and extending over a considerable area, one of said metallic plates adapted to be connected to one pole of an energizing alternating potential, the remainder of said metallic plates adapted to be connected to the other pole of such energizing alternating potential, a layer comprising electroluminescent phosphor over at least said remainder of said metallic plates, an electrical-insulating material layer over said one metallic plate, an electrically-isolated light-transmitting and electrically-conducting layer over said layer comprising electroluminescent phosphor and said electrical insulating material layer, the spacing between all of said metallic plates and the respective portions of said light-transmitting conducting layer proximate each of said metallic plates being substantially constant, said light-transmitting electrically-conducting layer being electrically insulated from all electrical leads adapted to be connected to said device for energization, said metallic plates all electrically insulated from one another, and said remainder of said metallic plates having different areas preselected in accordance with different electroluminescent brightness desired to be emitted from portions of said layer comprising electroluminescent phosphor.

References Cited in the file of this patent

UNITED STATES PATENTS

| | | |
|---|---|---|
| 2,773,216 | Edmonds | Dec. 4, 1956 |
| 2,847,602 | Michlin | Aug. 12, 1958 |
| 2,928,974 | Mash | Mar. 15, 1960 |

FOREIGN PATENTS

| | | |
|---|---|---|
| 530,011 | Canada | Sept. 4, 1956 |